(12) United States Patent
Baic

(10) Patent No.: US 9,415,876 B1
(45) Date of Patent: Aug. 16, 2016

(54) PRESSURE RELIEF LATCH

(71) Applicant: Avibank Manufacturing, Inc., North Hollywood, CA (US)

(72) Inventor: Zeljko Baic, Sylmar, CA (US)

(73) Assignee: Avibank Manufacturing, Inc., North Hollywood, CA (US)

( * ) Notice: Subject to any disclaimer, the term of this patent is extended or adjusted under 35 U.S.C. 154(b) by 224 days.

(21) Appl. No.: 14/035,689

(22) Filed: Sep. 24, 2013

(51) Int. Cl.
*E05C 19/12* (2006.01)
*B64D 29/06* (2006.01)
*E05C 19/04* (2006.01)
*E05C 1/12* (2006.01)
*E05C 19/14* (2006.01)

(52) U.S. Cl.
CPC . *B64D 29/06* (2013.01); *E05C 1/12* (2013.01); *E05C 19/04* (2013.01)

(58) Field of Classification Search
CPC .............. B64D 29/06; B64C 2001/009; E05B 15/0086; E05B 65/102; E05C 1/004; E05C 1/06; E05C 1/065; E05C 1/12; E05C 1/14; E05C 1/145; E05C 19/14; E05C 19/145; E05C 19/02; E05C 19/04; E05C 19/06
USPC ......... 292/145, 137, 163, 167, 168, 173, 175, 292/138, 164, 139, 143, 146, 147, 148, 150, 292/152, 192, 193, 256, 256.5, 256.69, 292/DIG. 49, DIG. 31, 23, 126, 100, 226, 292/200, 93, 166, DIG. 11
See application file for complete search history.

(56) References Cited

U.S. PATENT DOCUMENTS

| 1,840,252 | A | * | 1/1932 | Reinhart | E05B 83/02 292/169 |
|---|---|---|---|---|---|
| 2,695,803 | A | * | 11/1954 | Mills | E05C 19/145 292/113 |
| 2,714,032 | A | * | 7/1955 | Mills | B60J 9/02 292/113 |
| 2,896,751 | A | * | 7/1959 | Henrichs | B64C 1/1407 292/246 |
| 2,904,141 | A | * | 9/1959 | Henrichs | E05C 19/145 292/108 |
| 3,259,412 | A | * | 7/1966 | Wheeler | E05C 19/145 292/113 |
| 4,768,815 | A | * | 9/1988 | Harmon | E05C 19/145 292/113 |
| 4,828,299 | A | * | 5/1989 | Poe | E05B 63/128 292/139 |
| 5,620,212 | A | | 4/1997 | Bourne | B64D 29/06 292/113 |
| 5,984,382 | A | * | 11/1999 | Bourne | B64D 29/06 292/113 |
| 6,042,156 | A | * | 3/2000 | Jackson | B64D 29/06 292/247 |
| 6,343,815 | B1 | * | 2/2002 | Poe | E05C 19/145 292/113 |
| 6,513,841 | B1 | * | 2/2003 | Jackson | B64D 29/06 292/126 |
| 6,755,448 | B2 | * | 6/2004 | Jackson | B64D 29/06 244/110 B |
| 8,261,500 | B2 | * | 9/2012 | Sprague | E04B 2/827 160/200 |
| 2008/0129056 | A1 | * | 6/2008 | Hernandez | E05B 63/143 292/98 |
| 2013/0328326 | A1 | * | 12/2013 | DeFrance | E05C 19/10 292/114 |

* cited by examiner

*Primary Examiner* — Alyson M Merlino
(74) *Attorney, Agent, or Firm* — R. Scott Kimsey, Esq.; Klein DeNatale Goldner

(57) ABSTRACT

A pressure relief latch includes a first housing, the first housing having a handle pivotably attached, and a safety release with a hook. A roller support is slidingly engaged with the first housing and linked to the handle. The roller support has a locking pin, and has a roller attached to one end. A second housing includes a spring and a keeper extending away from the spring. When the latch is in use, the keeper of the second housing and the roller of the first housing are engaged when the latch is in the closed position. The hook of the safety release engages the locking pin of the roller support when the latch is in the closed position, preventing upward rotation of the handle. When the safety release is actuated, the hook disengages the locking pin. Upward rotation of the handle causes the roller and the keeper to disengage.

6 Claims, 4 Drawing Sheets

PRESSURE RELIEF LATCH

RELATED APPLICATIONS

Not Applicable.

BACKGROUND OF THE INVENTION

1. Field of the Invention

The present invention relates generally to a latch, and more specifically to a pressure relief latch for use with an aircraft.

2. Background

Heated air, under high pressure, is generated during operation of a modern aircraft. The air is directed through various structures in the aircraft for venting or to perform a variety of function for the aircraft. Pressure relief doors or panels are provided to allow pressure to vent when necessary, to prevent failure of metal skin panels or other structures of the aircraft. The panels also allow for easy access to internal portions of these areas, so that routine maintenance and inspection operations may be performed.

One example of an aircraft component that benefits from a pressure relief latch is the engine cowling. Aircraft engines have high internal operating pressure, and the cowling is rated to a maximum pressure. As the internal pressure approaches near to the maximum allowable pressure, it is desirable for the latch to open automatically to prevent overpressure. Although such a latch is not designed to open automatically until a given high-pressure value is reached, maintenance and inspection personnel require access to the interior of the cowling and should be able to open the latch easily when necessary.

SUMMARY OF THE INVENTION

A pressure relief latch includes a first housing fastenable to a first panel to be secured by the latch. The first housing has a handle pivotably attached, and a safety release with a hook. A roller support is slidingly engaged with the first housing and operatively linked to the handle. The roller support has a locking pin, and also has a roller attached to one end. A second housing is fastenable to a second panel, and includes a compression spring and a keeper extending away from the compression spring. The first and second housings are secured to panels (such as, for example, aircraft panels) such that the keeper of the second housing and the roller of the first housing are engaged when the latch is in the closed position. The hook of the safety release engages the locking pin of the roller support when the safety is engaged, ensuring the latch remains in the closed position by preventing upward rotation of the handle. When the safety release is actuated, the hook disengages the locking pin and the handle can be rotated upward. Upward rotation of the handle causes the roller and the keeper to disengage.

The first housing may include an attachment plate with an upper surface and a lower surface. Openings in the attachment plate are sized and shaped to receive fasteners for attaching the first housing to a first aircraft panel. The attachment plate may include a cutout portion extending through the thickness of the plate.

The first attachment plate may also include first and second support tabs extending from the lower surface of the first attachment plate. The support tabs are in spaced-apart relation with respect to one another, so as to form a channel between the two support tabs, and are at a first end of the attachment plate. Each of the support tabs defines an elongate aperture therethrough.

The first attachment plate may also include first and second hinge plates extending from the lower surface of the attachment plate at a second end thereof. The hinge plates are spaced apart to define a channel therebetween, and each of the first and second hinge plates defines an aperture therethrough.

The handle may be disposed within the cutout portion of the first attachment plate, and may be pivotably attached to a support pin extending between the apertures of the first and second pins tabs. The handle may also include first and second spaced-apart hinge members defining a channel between the two, each of the hinge members also have elongate apertures formed therein.

The safety release may be pivotably attached to the handle and may include first and second hooks extending from the lower surface of the safety release.

The roller support may include a first yoke with a roller support pin that extends between the elongate apertures of the two support tabs extending from the first attachment plate. A second yoke may be provided, attached to a connector between the first yoke and the second yoke. The second yoke may include a handle pin extending between the apertures of the hinge members of the handle.

The roller support may also include a locking pin between the first and second yoke. The locking pin may extend between the two hooks of the safety release when the pressure relief latch is in a closed position.

The second housing may also include an attachment plate having an upper surface and a lower surface and including a plurality of openings for attaching the second attachment plate to a second panel.

A sleeve may extend from the lower surface of the second attachment plate. The sleeve includes a central bore extending through the sleeve, and may include tabbed portions extending outwardly to either side. Each of the tabbed portions may define a spring fastener aperture.

A keeper assembly may be provided, the keeper assembly including a plate and a keeper extending from the plate. The keeper assembly may be mated with the sleeve such that the keeper extends through the central bore of the sleeve. The plate of the keeper assembly has spring fastener apertures in alignment with the spring fastener apertures of the sleeve.

A spring plate maybe provided, the spring plate having first and second ends. Each of the ends defines a spring plate aperture.

A first compression spring may be provided extending between a first aperture of the spring plate and a spring fastener aperture of the keeper assembly plate.

A second compression spring may be provided extending between a second aperture of the spring plate and a second spring fastener aperture of the keeper assembly plate.

A first fastener may be provided, extending through the first aperture of the spring plate, through the first compression spring, and through the first spring fastener apertures in the keeper assembly and the sleeve.

A second fastener may also be provided, extending through the second aperture of the spring plate, through the second compression spring, and through the second spring fastener apertures in the keeper assembly and the sleeve.

Nuts may be provided, made up to the portions of the fasteners protruding from the sleeve.

DETAILED DESCRIPTION OF THE INVENTION

In the course of the following description, various relative terms such as "up," "down," "upper," and "lower" may be used to described aspects of the present invention. As used herein, these terms describe components of the present invention as oriented in FIG. 2, with attachment plates 88 and 90 representing "upper" portions of pressure relief latch 10. It is to be understood the these terms are used for purposes of clarity and for ease of understanding of the invention, and are not intended to suggest any particular orientation of pressure relief latch 10 when in use for its intended purpose.

Figure 1:
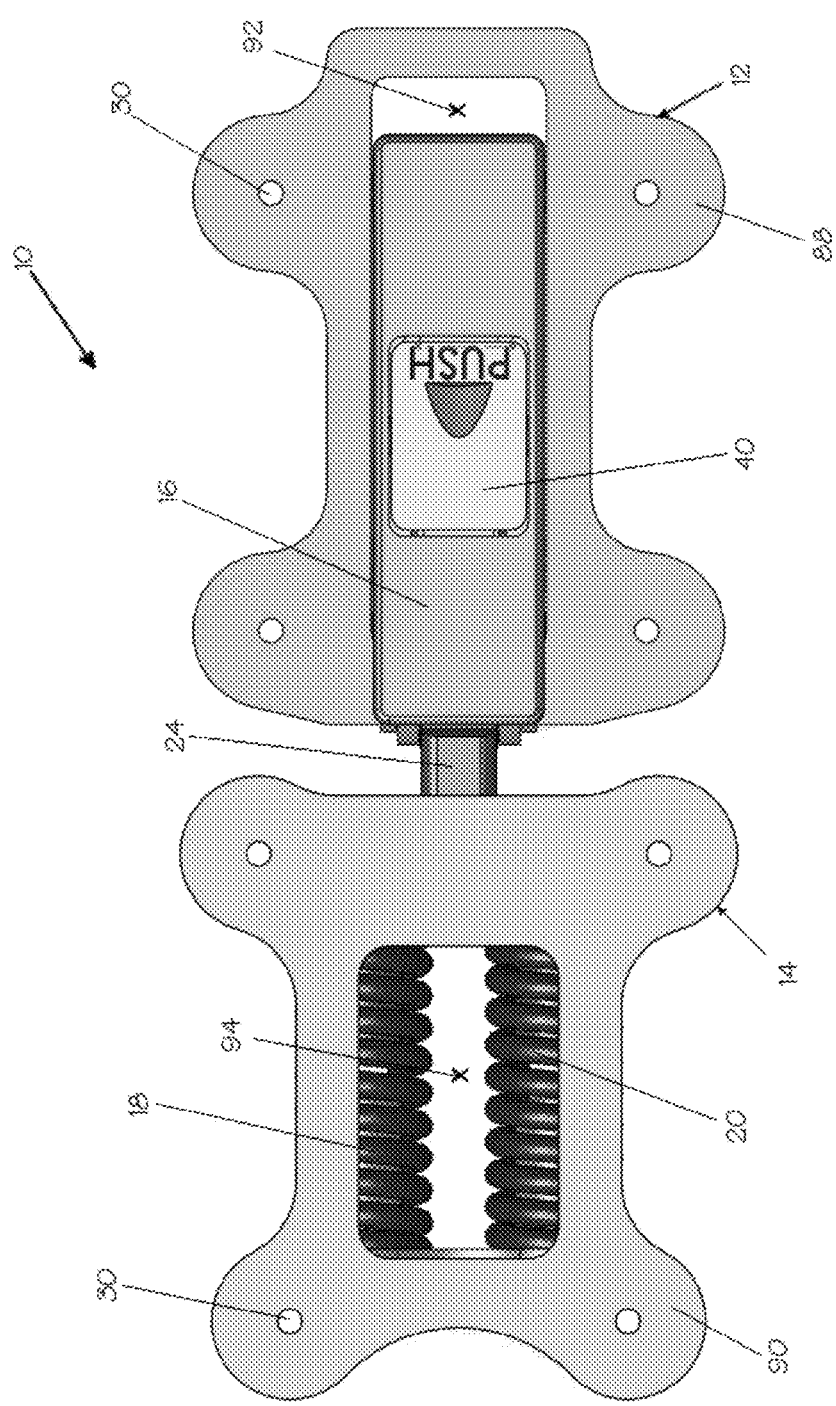
FIG. 1 is a top elevation view of an embodiment of a pressure relief latch.

FIG. 1 provides a top view of a pressure relief latch 10 having a first housing 12 and a second housing 14. In operation, first and second housings 12 and 14 are affixed to separate doors or panels of a structure in which pressure may increase. For example, first and second housings 12 and 14 may be fastened to opposing doors or panels of an aircraft engine cowling. First housing 12 and second housing 14 each include an attachment plate (attachment plates 88 and 90, respectively) having a plurality of openings 30 through which fasteners may be inserted to attach first and second housings 12 and 14 to the appropriate structure. Any suitable fasteners may be used to effect the attachment.

Also visible in the top view shown in FIG. 1 are first compression spring 18 and second compression spring 20 of second housing 14, which can be seen through second cutout portion 94. Also shown are handle 16 associated with first housing 12 and disposed within first cutout portion 92, safety release 40 of handle 16, and keeper 24 extending from second housing 14 toward first housing 12. As shown in FIG. 1, pressure relief latch 10 is in a closed configuration.

Figure 2:
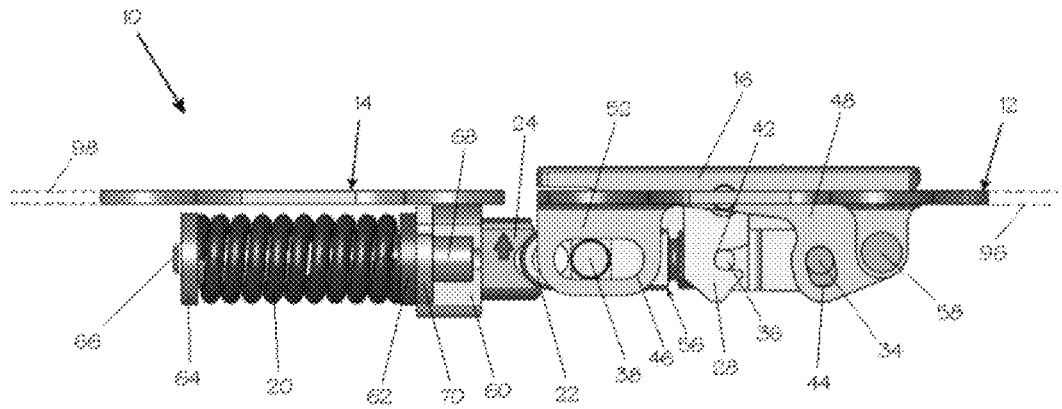
FIG. 2 is a side elevation view of the pressure relief latch of FIG. 1.

FIG. 2 provides a side view of pressure relief latch 10 of FIG. 1. First housing 12 and second housing 14 are shown side by side, in substantially the same relative positions as they would be when pressure relief latch 10 is installed in a suitable structure for its intended use. Handle 16 extends partially above and partially below first attachment plate 88. Handle 16 includes first hinge member 48 and second hinge member 50 extending downward therefrom, each including an elongate aperture 44 defined therein. Hinge plates 74 and 76 also extend downwardly from the underside of first housing 12. Hinge plate 74 and hinge plate 76 each have an aperture to receive a portion of pivot pin 58, which also extends through a portion of handle 16 so that handle 16 can rotate therearound. Handle pin 34 extends between apertures 44 in the first hinge member 48 and second hinge member 50 and allows limited rotational movement of handle 16 as handle pin 34 travels the length of apertures 44.

Safety release 40 includes hooks 28 and 29 that extend downwardly through an opening in housing 12. Hooks 28 and 29 are shaped to form catches 42 for receiving opposing ends of locking pin 36. When pressure relief latch 10 is in the closed position, locking pin 36 is received within catches 42, locking pressure relief latch 10 in the closed position.

First housing 12 also includes first support tab 52 and second support tab 54 extending downward at opposing edges thereof. First support tab 52 and second support tab 54 are spaced apart to form a channel between the two. Each of first support tab 52 and second support tab 54 includes an elongate aperture 46. A roller support 56 is disposed between the first support tab 52 and the second support tab 54, in the channel formed between the two tabs. Roller support 56 has a first end with a roller 22 attached thereto, and extends longitudinally to a second end disposed between first hinge member 48 and second hinge member 50.

As shown in the drawings, roller support 56 includes a first yoke 78, a second yoke 80, and a connector 82 therebetween. It is contemplated that roller support 56 may include any suitable structure that allows the appropriate placement of pins or detents thereon, and may include multiple components or may be constructed from a single, unitary component.

A number of pins are associated with roller support 56, as shown in the drawings. A roller support pin 38 is provided near the first end of roller support 56, closest to roller 22. The two opposing ends of roller support pin 38 are received into the elongate apertures 46 of first support tab 52 and second support tab 54, respectively. A handle pin 34 is provided near the second end of roller support 56, the opposite end of roller support 56 from roller 22. The two opposing ends of handle pin 34 are received into the elongate apertures 44 in first hinge member 48 and second hinge member 50, respectively. A third pin, locking pin 36, extends through the width of roller support 56 at a point between roller support pin 38 and handle pin 34. The two opposing ends of locking pin 36 may be engaged by one of hooks 28 and 29 of safety release 40 when pressure relief latch 10 is in a closed position. It is contemplated that, instead of pins extending through the width of roller support 56, the outer surface of roller support 56 may include hinge members such as pins or detents at appropriate points along the length thereof, and that such structures may serve the functions of the pins as shown in the figures and described herein.

Figure 3:
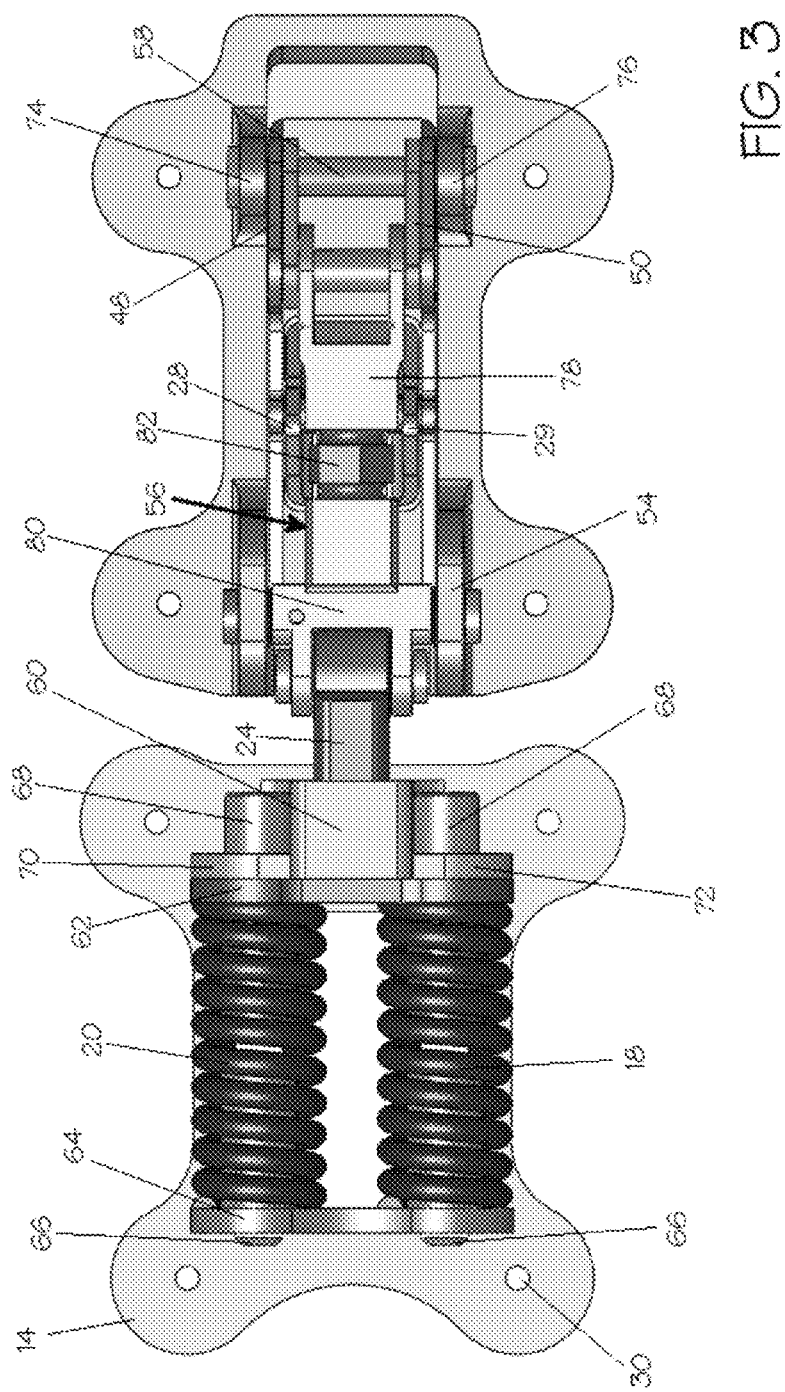
FIG. 3 is a bottom elevation view of the pressure relief latch of FIG. 1.
Figure 4:
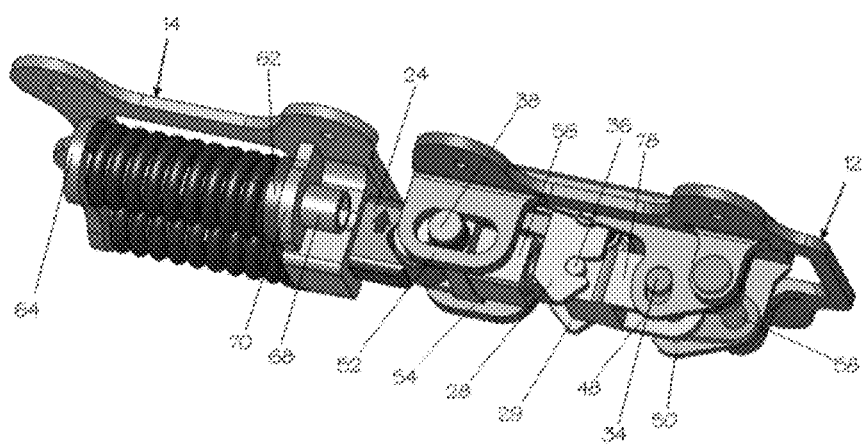
FIG. 4 is a side perspective view of the pressure relief latch of FIG. 1.

Second housing 14 has a sleeve 60 extending downward therefrom. Sleeve 60 provides structural support for the keeper and compression springs of pressure relief latch 10, as described more fully below. The structural features of sleeve 60, and how they relate to the keeper and springs of pressure relief latch 10, are best shown in FIGS. 3 and 4, which shows a bottom view of pressure relief latch 10.

As shown in the drawings, the main body of sleeve 60 has a tabbed structure extending from either side thereof. First sleeve tab 70 and second sleeve tab 72 have openings (not shown) therethrough for insertion of fasteners 66 used to maintain compression springs 18 and 20 in place. First sleeve tab 70 and second sleeve tab 72 have opposing flat surfaces, one surface of each allowing a nut 68 to be flush therewith when the nuts are made up with fasteners 66. The opposing surfaces of first sleeve tab 70 and second sleeve tab 72 fit flush against a keeper plate 62, which is integrally formed with keeper 24. Keeper 24 extends through a central bore (not shown) in the body of sleeve 60, until keeper plate 62 abuts first sleeve tab 70 and second sleeve tab 72. Compression springs 18 and 20 extend between keeper plate 62 and a spring plate 64, with fasteners 66 extending through spring plate 64, through the interior lengths of compression springs 18 and 20 respectively, through keeper plate 62, and through first and second sleeve tabs 70 and 72. Nuts 68 are made up with the ends of fasteners 66 protruding from first and second sleeve tabs 70 and 72, securing the assembly of compression springs 18 and 20 to second housing 14. Additional structural components, such as hollow cylindrical structures, may be provided around fasteners 66 to separate the length of fasteners 66 with springs 18 and 20 and preventing direct contact therebetween.

Operation of pressure relief latch 10 is now described. First and second housings 12 and 14 are fastened to adjacent panels of a structure desired to be secured with pressure relief latch 10. FIG. 2 shows exemplary placement of housings 12 and 14 on first panel 96 and second panel 98 of an appropriate structure. At least one of the two panels opens relative to the other, though it is contemplated that both panels may be capable of opening. When the pressure relief latch 10 is in the closed position, as shown in the drawings, keeper 24 associated with second housing 14 is engaged with roller 22 associated with first housing 12. Compression springs 18 and 20 prevent roller 22 from forcing keeper 24 inward, under normal conditions, and thereby preventing the panels secured by pressure relief latch 10 from opening. Handle 16 is in the closed position, as shown, and hooks 28 and 29 of safety release 40 are engaged with locking pin 36. Handle 16 cannot be moved upward, to the unlocked position, because of the engagement of safety release 40 and locking pin 36 prevents the upward movement.

When it is necessary or desirable to manually open the panels secured by pressure relief latch 10, safety release 40 is actuated, causing hooks 28 and 29 to disengage locking pin 36. Once locking pin 36 is disengaged, handle 16 can be rotated in an upward direction, pivoting on pivot pin 58. The rotational movement of handle 16 causes roller 22 to axially retract from keeper 24, allowing one or both of the panels with which pressure relief latch 10 is associated to be opened. When it is desired to close pressure relief latch 10, handle 16 is rotated in a downward direction, causing roller 22 to engage keeper 24. Hooks 28 and 29 engage locking pin 36 to prevent inadvertent opening of pressure relief latch 10 due to unwanted upward rotation of handle 16.

Pressure relief latch 10 is designed to open automatically under predetermined pressure conditions (e.g. just prior to the maximum pressure for which the structure is rated), to allow a release of pressure prior to damage to, or failure of, panels or other portions of the structure in which pressure relief latch 10 is being used (an aircraft engine cowling, for example). The pressure level at which pressure relief latch 10 opens automatically is determined by the properties of compression springs 18 and 20. As pressure builds within the structure on which pressure relief latch 10 is being used, that pressure tends to force one or more of the panels open. The engagement between keeper 24 and roller 22 provides a competing tendency to hold the panels closed. When the pressure becomes sufficiently strong, the force pushing against, for example, the panel to which first housing 12 is fastened becomes sufficiently strong that roller 22 is forced upward with respect to keeper 24, forcing keeper 24 inward against the action of compression springs 18 and 20. When this occurs, pressure relief latch 10 opens, allowing pressure to be released from the interior of the structure.

Pressure relief latch 10 may be used to secure a variety of panels enclosing interior spaces subject to increases in pressure. In the situation where a single panel opens, either first housing 12 or second housing 14 may be installed on the panel that opens. The pressure relief latch 10 may also be used in the situation where two adjacent panels both open, and where first housing 12 is installed on one panel and second housing 14 is installed on the other panel.

The foregoing description and attached drawings are exemplary of a pressure relief latch, and are provided for purposes of clarity in understanding the invention. It is to be understood that various modifications to that shown and described herein will be readily apparent to one of skill in the art upon reading this disclosure. Such modification are within the spirit and scope of the present invention.

Having thus described the preferred embodiment of the invention, what is claimed as new and desired to be protected by Letters Patent includes the following:

1. A pressure relief latch for use with first and second panels of a structure to be secured by the latch, the pressure relief latch comprising:
   a first housing fastenable to the first panel, the first housing comprising an upper surface and a lower surface, and first and second support tabs extending from said lower surface, the first and second support tabs in spaced-apart relation and defining a channel therebetween, each of said first and second support tabs defining an elongate aperture therethrough,
   a handle pivotably attached to the first housing;
   a safety release attached to the handle and comprising a hook;
   a roller support comprising a first end, a second end, and a body extending between the first end and the second end, the roller support disposed within the channel between the first and second support tabs;
   a roller attached to the first end of the roller support;
   a roller support pin attached to the body of the roller support at a position nearer the first end of the roller support than the second end of the roller support and extending from the elongate aperture of the first support tab to the elongate aperture of the second support tab;
   a handle pin attached to the roller support at a position nearer the second end of the roller support than the first end of the roller support, the handle support pin engaging said handle;
   a locking pin attached to the roller support between the roller support pin and the handle pin;
   a second housing fastenable to the second panel, the second housing comprising an upper surface and a lower surface;
   a compression spring attached to the lower surface of the second housing; and
   a keeper attached to the compression spring and extending away therefrom,
   wherein when the pressure relief latch is in a closed position, the keeper engages the roller such that the latch retains the panels in a closed position,
   and further wherein when the pressure relief latch is in the closed position, the hook of the safety release engages the locking pin, thereby preventing upward movement of the handle to an open position,
   and further wherein when the safety release is actuated, the hook disengages the locking pin, allowing upward rotation of the handle, the upward rotation of the handle causing the roller support to move away from the keeper and the roller to disengage the keeper, allowing at least one of the panels to open
   wherein when a pressure inside the structure being secured reaches a predetermined level the roller is forced upward along the keeper until it disengages the keeper, thereby relieving pressure within the structure.

2. The pressure relief latch according to claim 1, wherein the keeper comprises a notch for secure engagement of the roller.

3. The pressure relief latch according to claim 1, wherein the roller support comprises:
   a first yoke attached to the first end of the roller support, the roller support pin rotatably attached to the roller pin and the first yoke;
   a second yoke attached to the second end of the roller support, the second yoke comprising the handle pin; and a connector fixedly attached to the first yoke and the second yoke and extending therebetween.

4. A pressure relief latch for use with first and second panels of a structure to be secured by the latch, the pressure relief latch comprising:
- a first housing fastenable to the first panel and comprising a handle pivotably attached thereto, a safety release comprising a hook, and a roller support slidingly engaged with the first housing and operatively linked to the handle, the roller support comprising a locking pin and a roller;
- a second housing fastenable to the second panel and comprising a compression spring attached thereto and a keeper extending away from the compression spring toward the roller,
- wherein when the latch is in a first, closed position, the roller engages the keeper and the hook of the safety release engages the locking pin of the roller support, preventing upward rotation of the handle to an open position,
- wherein when the safety release is actuated, the hook disengages the locking pin such that the handle is capable of upward rotation, wherein the upward rotation of the handle causes movement of the roller support to disengage the roller from the keeper, and further wherein when a pressure within the structure to be secured exceeds a force exerted on the keeper by said compression spring, the roller is disengaged from the keeper.

5. The pressure relief latch according to claim 4 wherein the keeper comprises a notch for secure engagement of the roller.

6. A pressure relief latch for use with first and second aircraft panels enclosing an interior space of said aircraft susceptible to high pressure, the pressure relief latch comprising:
- a first housing comprising:
  - an first attachment plate, the first attachment plate comprising an upper surface and a lower surface and defining a plurality of openings extending from the upper surface to the lower surface, the openings for receiving fasteners therethrough for attaching the first housing to said first aircraft panel;
  - a cutout portion defined in the first attachment plate and extending from the upper surface to the lower surface thereof;
  - first and second support tabs extending from the lower surface of the first attachment plate in spaced-apart relation at a first end thereof, said first support tab defining a first elongate aperture and said second support tab defining a second elongate aperture, the first and second support tabs further defining a channel therebetween; and
  - first and second hinge plates extending from the lower surface of the first attachment plate at a second end thereof, said first hinge plate defining a first pin aperture and said second hinge plate defining a second pin aperture, the first and second hinge plates further defining a channel therebetween;
- a handle disposed within the cutout portion of the first attachment plate, the handle pivotably attached to a support pin, the support pin extending between the first pin aperture and the second pin aperture of the first and second hinge plates, the handle further comprising first and second spaced-apart hinge members defining a channel therebetween, the first hinge member defining a third elongate aperture therein and the second hinge member defining a fourth elongate aperture therein;
- a safety release pivotably attached to the handle and comprising an upper surface and a lower surface, the safety release further comprising first and second hooks extending from the lower surface thereof;
- a roller support comprising:
  - a first yoke comprising a roller support pin, the roller support pin extending between the first elongate aperture of the first support tab of the housing and the second elongate aperture of the second support tab of the housing;
  - a connector attached to the first yoke;
  - a second yoke attached to the connector, the second yoke comprising a handle pin extending between the third elongate aperture of the first hinge member of the handle and the fourth elongate aperture of the second hinge member of the handle;
  - a locking pin between the first yoke and the second yoke, the locking pin extending between the first hook and the second hook of the safety release when the pressure relief latch is in a closed position;
- a second housing comprising:
  - a second attachment plate, the second attachment plate comprising an upper surface and a lower surface and defining a plurality of openings extending from the upper surface to the lower surface thereof, the openings for receiving fasteners therethrough for attaching the second housing to said second aircraft panel; and
  - a sleeve extending from the lower surface of the second attachment plate, the sleeve comprising a central bore extending therethrough, a first tabbed portion extending outwardly therefrom and defining a first spring fastener aperture therein, and a second tabbed portion extending outwardly therefrom and defining a second spring fastener aperture therein;
- a keeper assembly having a first end comprising a plate and a keeper protruding from the plate, the keeper extending through the central bore of the sleeve, the plate defining a third spring fastener aperture in alignment with the first spring fastener aperture of the sleeve and defining a fourth spring fastener aperture in alignment with the second spring fastener aperture of the sleeve;
- a spring plate comprising first and second ends, the first end of the spring plate defining a first spring plate aperture and the second end of the spring plate defining a second spring plate aperture;
- a first compression spring extending between the first spring plate aperture and the third spring fastener aperture;
- a second compression spring extending between the second spring plate aperture and the fourth spring fastener aperture;
- a first fastener extending through the first spring plate aperture, a longitudinal interior space of the first compression spring, the third spring fastener aperture, and the first spring fastener aperture;
- a second fastener extending through the second spring plate aperture, a longitudinal interior space of the second compression spring, the fourth spring fastener aperture, and the second spring fastener aperture;
- a first nut fastened to a portion of said first fastener protruding from the first spring fastener aperture; and
- a second nut fastened to a portion of said second fastener protruding from the second spring fastener aperture,
- wherein when the pressure relief latch is in a closed position, the keeper engages the roller such that the latch retains said first and second panels in a closed position, and further wherein when the safety release is actuated, the first and second hooks disengage the locking pin, allowing upward rotation of the handle, the upward rotation of the handle causing the roller to disengage the keeper.

* * * * *